United States Patent [19]

Skidmore et al.

[11] Patent Number: 5,209,520
[45] Date of Patent: May 11, 1993

[54] AIR BAG RESTRAINT SYSTEMS

[75] Inventors: Gerald P. Skidmore, Nuneaton; Mark A. Lambert, Rugby, both of United Kingdom

[73] Assignee: Jaguar Cars Limited, United Kingdom

[21] Appl. No.: 895,356

[22] Filed: Jun. 8, 1992

[30] Foreign Application Priority Data

Jun. 14, 1991 [GB] United Kingdom ............... 9112921

[51] Int. Cl.$^5$ ............................................. B60R 21/16
[52] U.S. Cl. ................................................... 280/732
[58] Field of Search .............. 280/732, 728, 730, 735, 280/741, 731

[56] References Cited

U.S. PATENT DOCUMENTS

| 4,167,276 | 9/1979 | Bell et al. | 280/731 |
| 4,960,292 | 10/1990 | Sadler | 280/731 |
| 5,046,757 | 9/1991 | Sadler et al. | 280/731 |
| 5,069,479 | 12/1991 | Koide et al. | 280/741 |
| 5,092,628 | 3/1992 | Tamura et al. | 280/731 |

FOREIGN PATENT DOCUMENTS

| 0367415 | 5/1990 | European Pat. Off. |
| 2374188 | 12/1977 | France . |
| 63-235144 | 9/1988 | Japan . |
| 2-303954 | 12/1990 | Japan . |
| 1575453 | 9/1980 | United Kingdom . |

Primary Examiner—Tamara L. Graysay
Attorney, Agent, or Firm—Davis, Bujold & Streck

[57] ABSTRACT

An air bag restraint system includes an air bag module having an inflator with arming plunger which must be depressed to arm the inflator, the air bag module is mounted between a pair of side plates of a bracket assembly for pivotal movement between operative and inoperative positions, catch plates are provided for releasably securing the air bag module in its operative position, an arming mechanism having a pin mounted with respect to the arming plunger for transverse movement with respect thereto betweeen a disarmed and armed position, the pin being arranged to engage a contoured end face of the arming plunger to depress the arming plunger as it moves from its disarmed to its armed position, the pin being biased to its disarmed position and an anvil associated with the bracket assembly being provided for engagement of the pin to move it from its disarmed to its armed position as the air bag module is pivoted from its inoperative to its operative position.

13 Claims, 2 Drawing Sheets

AIR BAG RESTRAINT SYSTEMS

BACKGROUND TO THE INVENTION

The present invention relates to air bag restraint systems for motor vehicles and in particular to the means for mounting an air bag module behind the fascia of a vehicle, but may also be applied to systems in which an air bag module is mounted in another location within the vehicle.

It is proposed to mount an air bag module of a restraint system for a motor vehicle behind a blow out panel on the fascia of the vehicle in front of the front passenger seat, so that in a collision, the air bag will be deployed in front of the passenger to prevent the passenger coming into contact with the fascia or windscreen. The air bag module comprises an inflator which includes a pyrotechnic device and a trigger device which in a collision will initiate a fast burn process to rapidly produce large volumes of gases which will inflate the air bag. For safety reasons, the trigger device of the inflator has a spring loaded plunger which must first be depressed to arm the inflator, before the inflator can be triggered.

The present invention provides means for mounting the air bag module which will prevent installation of the air bag module without it being armed and removal of the air bag module from the vehicle until the air bag module has been disarmed.

SUMMARY OF THE INVENTION

According to one aspect of the present invention, an air bag restraint system comprises an air bag module having an inflator with an arming plunger which must be depressed to arm the inflator, the air bag module being mounted between a pair of side plates of a bracket assembly for pivotal movement between inoperative and operative positions, means for releasably securing the air bag module in its operative position, an arming mechanism comprising a pin mounted with respect to the arming plunger for transverse movement with respect thereto between a disarmed and an armed position, the pin being adapted to engage a contoured end face of the arming plunger to depress the arming plunger as it moves from its disarmed to its armed position, the pin being biased to its disarmed position and an anvil associated with the bracket assembly being provided for engagement of the pin to move it from its disarmed to its armed position as the air bag module is pivoted from its inoperative to its operative position.

According to a preferred embodiment, means is associated with the air bag module for preventing access to fixing means for the bracket assembly when the air bag module is in its operative position, thereby preventing removal of the air bag module while it is armed. Furthermore, while in its inoperable position, the air bag module will preferably foul the overlying fascia trim panel, so that the latter may not be fitted until the air bag module has been moved to its operative position and the inflator armed.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figure 1:
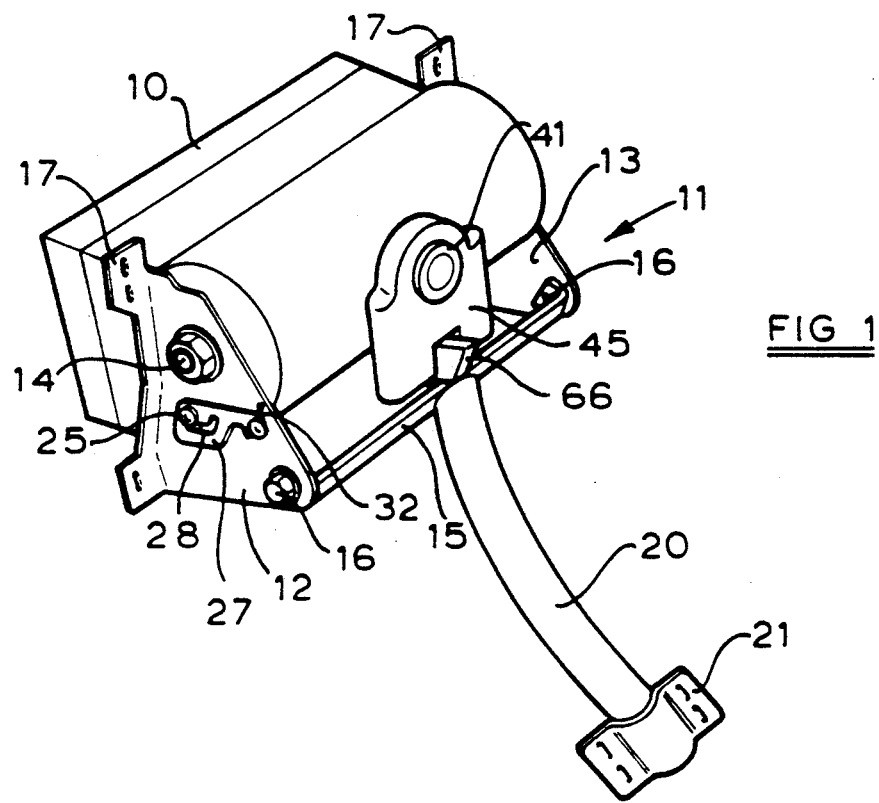
FIG. 1 is a perspective view from the rear of an air bag module and bracket assembly of an air bag restraint system in accordance with the present invention, the air bag module being in its operative position.

As illustrated in the accompanying drawings, an air bag restraint system includes an air bag module 10 of known construction. The air bag module 10 is pivotally mounted between a pair of side plates 12 and 13 of a bracket assembly 11, on a pair of studs 14 extending one from either end of the air bag module 10.

The side plates 12 and 13 of bracket assembly 11 are interconnected by a cross member 15, secured at either end to the side plates 12 and 13 by means of bolts 16. Each of the side plates 12 and 13 has a flange formation 17 by which it may be secured to the vehicle body 18 by means of a bolt 19. A tubular reaction member 20 is welded at one end to the cross member 15, a bracket 21 being provided adjacent the other end by which it may be secured to the vehicle body. The tubular reaction member 20 ensures that impacts on the vehicle are transmitted to the air bag module 10, to cause triggering thereof if they are of sufficient magnitude.

A second stud 25 extends from each end of the air bag module 10, at a position spaced from the studs 14. The studs 25 extend through arcuate holes 26 in the side plates 12 and 13 and apertures 28 in catch plates 27 pivotally mounted on each of the side plates 12 and 13. The apertures 28 define a pair of angularly spaced detents 29 and 30 interconnected by an arcuate portion 31. The catch plates 27 are loaded by means of springs 32 so that when the studs 25 are aligned with one of the detents 29 or 30, the catch plates 27 will be biased so that the studs 25 will engage in the detents 29 or 30. The catch plates 27 may then be lifted manually against the load applied by spring 32 to disengage the studs 25 from detents 29, 30 so that the air bag module 10 may be pivoted until the studs 25 are aligned with the other detents 30, 29 when the catch plates 27 may be released to lock the air bag module 10 in that position.

Figure 2:
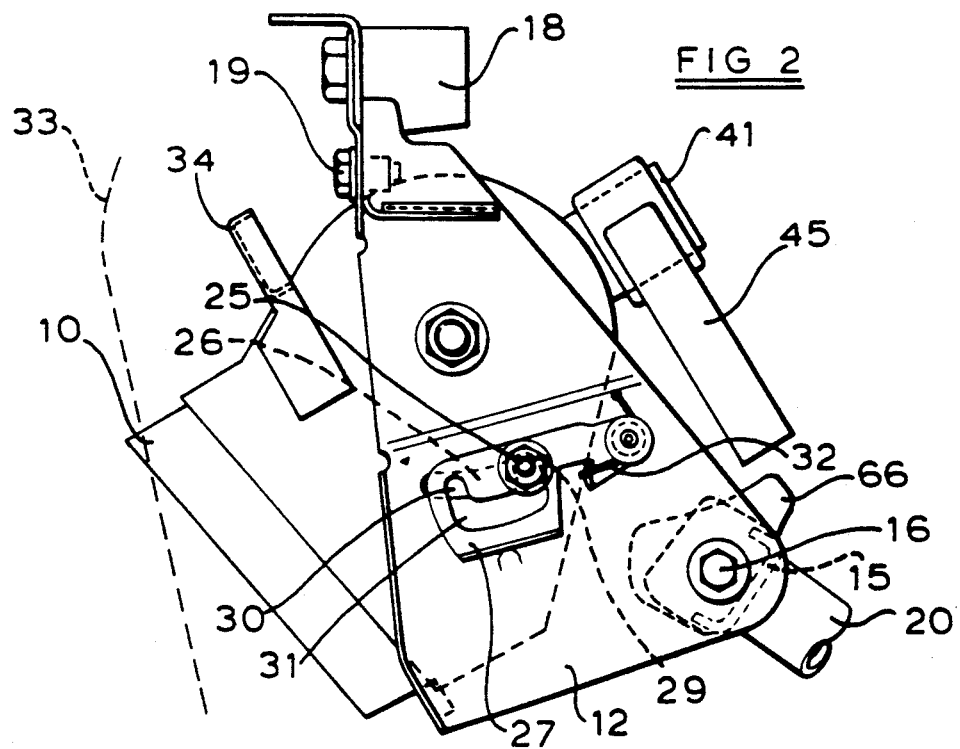
FIG. 2 is an end elevation of the air bag module and bracket assembly showing the air bag module in its inoperative position.
Figure 3:
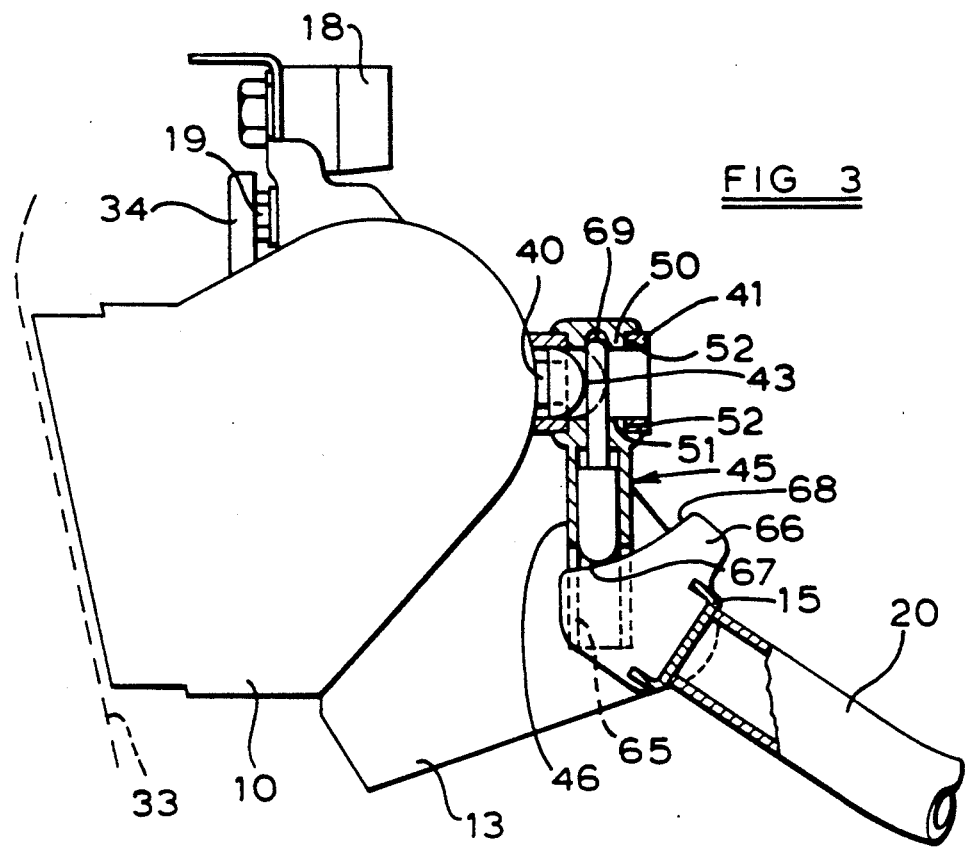
FIG. 3 is a partial sectional elevation of the air bag module and bracket assembly in its operative position.

The detents 29 and 30 define respectively an inoperative position in which the air bag module 10 is pivoted downwardly as illustrated in FIG. 2, and an operative position in which the air bag module 10 is directed forwardly as illustrated in FIG. 3. In the operative position, the front of the air bag module 10 will be located in close proximity to a burstable panel on fascia trim panel 33. In the inoperative position, the front of the air bag module 10 moves forwardly beyond the line of the fascia trim panel 33, so that the latter may not be fitted until the air bag module is pivoted to its operative position. Cap members 34 are provided on each end of the air bag module 10, the caps 34 being located such that when the air bag module 10 is in its operative position, they will overlie the fixing bolts 19, thus preventing removal of the air bag module 10 and bracket assembly 11 from the vehicle while the air bag module 10 is in its operative position. The studs 14 and 25 are provided with nuts which may be tightened to clamp the air bag module 10 when in its operative position.

The air bag module 10 includes an inflator (not shown) having a spring loaded arming plunger 40 which is surrounded by a tubular guard 41 extending from the rear of the air bag module 10.

Figure 4:
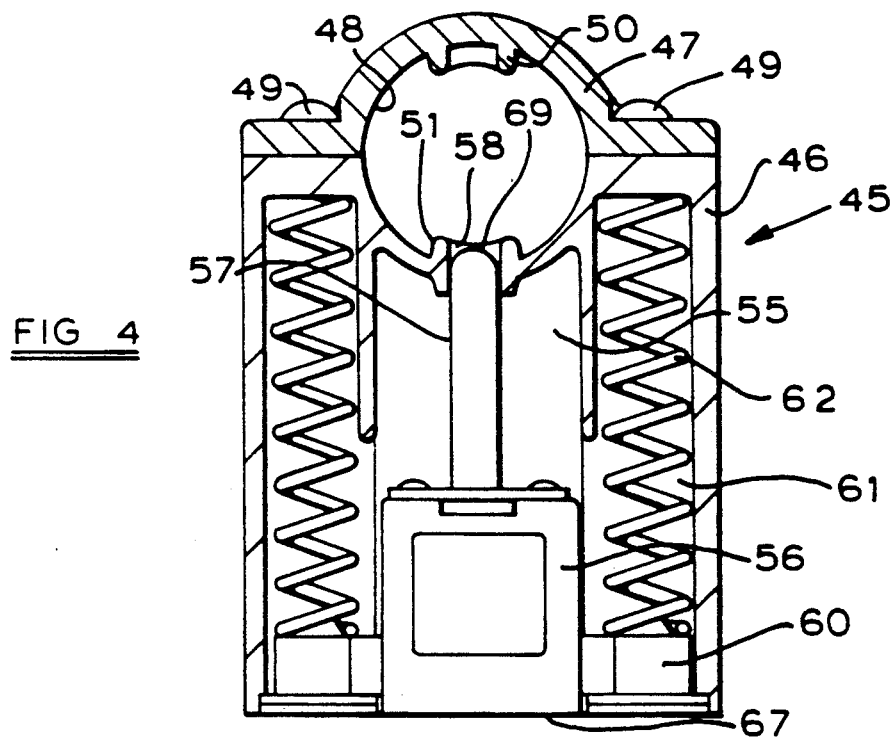
FIG. 4 is a sectional elevation of the arming mechanism of the air bag restraint system shown in FIGS. 1 to 3.

An arming mechanism 45, as illustrated in detail in FIGS. 3 and 4, has a housing 46. One end of the housing 46 has a cap member 47 which may be secured to the body of the housing 46 by means of a pair of screws 49 to define an aperture 48 corresponding to the external diameter of the tubular guard 41, so that the housing 46 may be clamped around the tubular guard 41. A pair of spigot formations 50, 51 engage in diametrically opposed apertures 52 in the tubular guard 41 to provide angular location of the arming mechanism 45 relative to the air bag module 10.

The housing 46 defines a central axially extending cavity 55 of rectangular section, in which a rectangular shoe 56 is slidably located. An arming pin 57 mounted on the shoe 52 extends axially of the cavity 55 and slidably engages through an aperture 58 in spigot formation 51. A pair of lugs 60 extend in opposite directions from opposite sides of the shoe 56 through axially extending apertures in the side walls of the cavity 55, into axial bores 61 on either side of the cavity 55. The ends of bores 61 adjacent the cap 47 are closed and compression springs 62 act between the closed ends of bores 61 and the lugs 60 to bias the shoe 52 to the end of the cavity 55 remote from the cap 47. The front and rear walls defining the chamber 55, at the end remote from cap 47, are partially cut away, to form a keyway 65 parallel to the plane of rotation of the air bag module 10. An anvil 66 is secured to the cross member 15 of bracket assembly 11, the anvil 66 being aligned in the same plane of rotation as the keyway 65.

The base 67 of the shoe 56 remote from end cap 47 is radiused and the opposed edge 68 of the anvil 66 is contoured such that as the air bag module 10 is rotated from its inoperative to its operative position, the shoe 56 will come into engagement with anvil 66 and will be urged axially of the housing 46 towards end cap 47, against the load applied by springs 62. The arming plunger 40 has a domed head 43 and the end 69 of arming pin 57 is rounded, such that as the arming pin 57 moves with the shoe 56, it will engage the domed head 43 of plunger 40 to depress plunger 40 and thus arm the inflator.

The air bag module 10 and bracket assembly 11 of the present invention may typically be installed in a vehicle by first securing the side plate 13 with cross member 15 attached thereto, to the vehicle body by means of bolt 19 and by securing the reaction member 20 to the vehicle by means of bracket 21. The air bag module 10 with side plate 12 fitted thereto may then be introduced from the front and side, with the air bag module in its inoperative position, the studs 14 and 25 being located through the appropriate apertures in side plate 13. The side plate 12 may then be secured to the vehicle by bolt 19 and to the cross member 15 by bolt 16. The catch plates 27 may then be lifted to release studs 25 from the detents 29 and the air bag module 10 rotated to its operative position, where engagement of studs 25 in detents 30 will retain it in that position. Finally the nuts on studs 14 and 25 may be tightened to clamp the air bag module 10 in its operative position and the front facia panel may then be fitted.

To remove the air bag module, the facia panel must first be removed and the air bag module 10 rotated back to its inoperative position to permit access to the fixing bolts 19. This will ensure that the inflator of the air bag module 10 is disarmed before removal.

Various modifications may be made without departing from the invention. For example, while in the above embodiment catch plates are provided at both sides of the air bag module, a single catch plate or other catch means need only be provided at one side. It is however preferred to provide releasable catch means at both sides.

The construction of the arming mechanism 45 may be varied in respect of; the manner in which the arming mechanism is mounted with respect to the arming plunger 40 of the air bag module; the manner in which the arming pin 57 is guided for movement transverse with respect to the arming plunger 40; and the manner in which the arming pin 57 is resiliently loaded. The surface engaged by the anvil 66 is however preferably contoured to provide smooth interengagement and the component defining this surface is located such that the appropriate alignment is maintained.

We claim:

1. An air bag restraint system comprising an air bag module having an inflator with an arming plunger which must be depressed to arm the inflator, the air bag module being mounted between a pair of side plates of a bracket assembly for pivotal movement between inoperative and operative positions, means for releasably securing the air bag module in its operative position, an arming mechanism comprising a pin mounted with respect to the arming plunger for transverse movement with respect thereto between a disarmed and an armed position, the pin being adapted to engage a contoured end face of the arming plunger to depress the arming plunger as it moves from its disarmed to its armed position, the pin being biased to its disarmed position and an anvil associated with the bracket assembly being provided for engagement of the pin to move it from its disarmed to its armed position as the air bag module is pivoted from its inoperative to its operative position.

2. An air bag restraint system according to claim 1 in which the bracket assembly is secured to the vehicle by releasable fastening means, means being provided on the air bag module to prevent access to the fastening means when the air bag module is in its operative position.

3. An air bag restraint system according to claim 2 in which the means to prevent access includes cap members provided on the air bag module for movement therewith between its operative and inoperative positions, the cap members being arranged to overlie the fastening means when the air bag module is in its operative position.

4. An air bag restraint system according to claim 1 in which the air bag module is positioned behind a trim panel, the air bag module being arranged to foul the trim panel when in its inoperative position.

5. An air bag restraint system according to claim 1 in which the air bag module is pivotally mounted between the side plates on a pair of first studs, one extending from each end of the air bag module, a second stud extending from at least one end of the air bag module through an arcuate hole in the adjacent side plate, and catch means being provided to engage said second stud when the air bag module is in its operative position.

6. An air bag restraint system according to claim 5 in which second studs extend from both ends of the air bag module through arcuate holes in the adjacent side plates, catch means being provided to engage said second studs when the air bag module is in its operative position.

7. An air bag module according to claim 5 in which the catch means comprises a spring loaded catch plate pivotally mounted on the side plate, the catch plate defining a pair of detents, one detent being arranged to engage the second stud when the air bag module is in its operative position and the other detent being arranged to engage said second stud when the air bag module is in its inoperative position.

8. An air bag restraint system according to claim 5 in which said first and second studs are provided with fastening means, by which the air bag module may be clamped in its operative position.

9. An air bag restraint system according to claim 1 in which the arming plunger extends from the rear of the air bag module and is surrounded by a tubular guard, the arming mechanism comprising a housing which is clamped around the tubular guard, the pin of the arming mechanism being slidably located within the housing for movement transverse to the arming plunger, apertures being provided in the tubular guard so that the pin may engage the arming plunger.

10. An air bag restraint system according to claim 9 in which the pin of the arming mechanism is biased away from the arming plunger.

11. An air bag restraint system according to claim 10 in which the housing of the arming mechanism defines an axially extending cavity of rectangular section, a rectangular shoe being slidably located within the cavity, the pin of the arming mechanism being mounted on the shoe and extending axially of the cavity and slidably extending through an aperture in the end of the cavity adjacent the arming plunger, a pair of lugs extending one from each side of the shoe, through axially extending apertures in the side walls of the cavity and spring means acting upon the lugs to bias the shoe away from the arming plunger, the front and rear walls of the housing defining the cavity at the end remote from the arming plunger being partially cut away to form a keyway parallel to the plane of rotation of the air bag module, the anvil being arranged to enter the keyway as the air bag module is pivoted from its inoperative to its operative position and engage the shoe forcing it towards the arming plunger so that the pin attached to the shoe engages and depresses the arming plunger.

12. An air bag restraint system according to claim 9 in which the housing of the arming mechanism defines an axially extending cavity of rectangular section, a rectangular shoe being slidably located within the cavity, the pin of the arming mechanism being mounted on the shoe and extending axially of the cavity and slidably extending through an aperture in the end of the cavity adjacent the arming plunger, a pair of lugs extending one from each side of the shoe, through axially extending apertures in the side walls of the cavity and spring means acting upon the lugs to bias the shoe away from the arming plunger, the front and rear walls of the housing defining the cavity at the end remote from the arming plunger being partially cut away to form a keyway parallel to the plane of rotation of the air bag module, the anvil being arranged to enter the keyway as the air bag module is pivoted from its inoperative to its operative position and engage the shoe forcing it towards the arming plunger so that the pin attached to the shoe engages and depresses the arming plunger.

13. An air bag restraint system according to claim 12 in which the end of the shoe remote from the arming plunger is radiused and the opposed surface of the anvil is correspondingly contoured to provide smooth movement of the shoe, as the air bag module is pivoted from its inoperative to its operative position.

* * * * *